Feb. 17, 1959 E. L. NASH 2,873,622
TOOTH SPACER FOR NON-SLIP DIFFERENTIAL GEARING
Filed May 25, 1956 2 Sheets-Sheet 1

INVENTOR
Edward L. Nash
BY
Wilson, Redrow & Sadler

Feb. 17, 1959         E. L. NASH         2,873,622
TOOTH SPACER FOR NON-SLIP DIFFERENTIAL GEARING
Filed May 25, 1956         2 Sheets-Sheet 2

2,873,622

TOOTH SPACER FOR NON-SLIP DIFFERENTIAL GEARING

Edward L. Nash, Ferndale, Mich., assignor to Studebaker-Packard Corporation, Detroit, Mich., a corporation of Michigan Application May 25, 1956, Serial No. 587,262

8 Claims. (Cl. 74—711)

This invention relates to differential gearing of the type utilized for automobiles for gearing between the axle shafts of rear axles and particularly to "non-slip" or "self-locking" types of automotive differentials.

Conventional automotive differentials have the inherent disadvantage that the total torque transmitted to the axles by the propeller shaft is divided substantially equally between the two rear axles under all driving conditions. If one of the rear wheels is on a slippery surface such as ice, for example, this rear wheel will spin and only a very small amount of torque is developed in the axle of the spinning wheel. Consequently, substantially the same small amount of torque is transmitted to the other axle by the differential.

"Non-slip" or "self-locking" differentials have been developed previously by others which operate so that the torque developed at the differential case can divide unequally between the two rear axles with the greater amount of torque being developed in the axle which presents the greatest resistance to rotation. Thus if one wheel spins on ice, a greater amount of torque can be delivered to the axle for the opposite rear wheel than to the axle of the spinning wheel. If both rear axles present the same amount of resistance to rotation the torque developed in each of the axles will be the same.

One type of "non-slip" differential which functions in the manner described in the preceding paragraph utilizes friction clutch means which operate between the differential case and the axles connected bevel side gears which are mounted so as to be axially movable relative to the case. In non-slip differentials of this type the pinion gears which mesh with the side gears are utilized to initiate forces which move the side gears axially into frictional engagement with the case. In one construction of this type the pinion gears which mesh with the axially movable side gears are laterally movable so that a pinion gear bears against and causes a side gear to move into frictional engagement with the case with a force which corresponds to axle load conditions. In another construction of the type referred to pinions having fixed axes of rotation relative to the case are provided with high pressure angle teeth which are effective to force the axially movable side gears into frictional engagement with the case. In both of these constructions there is relative movement between pinion and side gears, other than rotational movement, such that the extent of the mutual penetration of meshing teeth varies.

The present invention is directed to a new and improved nonslip differential of the type having axially movable side gears in which a new and improved tooth spacer means is provided between the side gears and the pinion gears which functions to limit the mutual penetration of meshing pinion and side gear teeth. This is a main object of the invention.

Another object of the invention is to provide a new and improved non-slip differential having axially movable side gears and laterally movable pinion gears in which new and improved tooth spacer means is provided which functions to limit the mutual penetration of meshing pinion and side gear teeth and functions to transmit forces from the pinion gears to the side gears independently of the meshing teeth.

Other objects of the invention will become apparent from the following specification, the drawing relating thereto and the appended claims.

The differential gearing of the present invention is described herein by way of illustration as being embodied in an automotive type differential.

Figure 1:
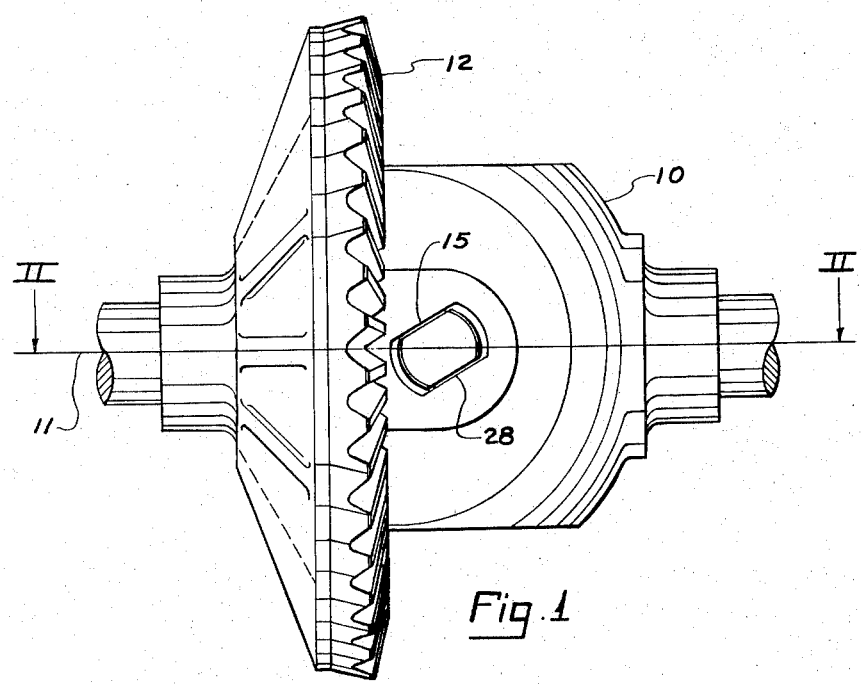
Fig. 1 shows primarily the case of a non-slip differential embodying the invention.

In Fig. 1 of the drawing there is shown a rotatable, one piece differential case 10 which is adapted to be rotatably mounted in a differential housing (not shown) for rotation about a longitudinal axis 11 which is fixed relative to the differential housing. Case 10 is provided with a ring gear 12 which may be driven by a pinion gear (not shown) attached to a power driven propeller shaft (not shown). Case 10 has openings or windows (not shown) on opposite sides thereof to facilitate assembly of the component parts therein.

There are formed in case 10 two parallel camming slots 15 and 16 on diametrically opposite sides of longitudinal axis 11 which are equally inclined relative to axis 11. Corresponding sides of slots 15 and 16 are in common planes.

Figure 2:
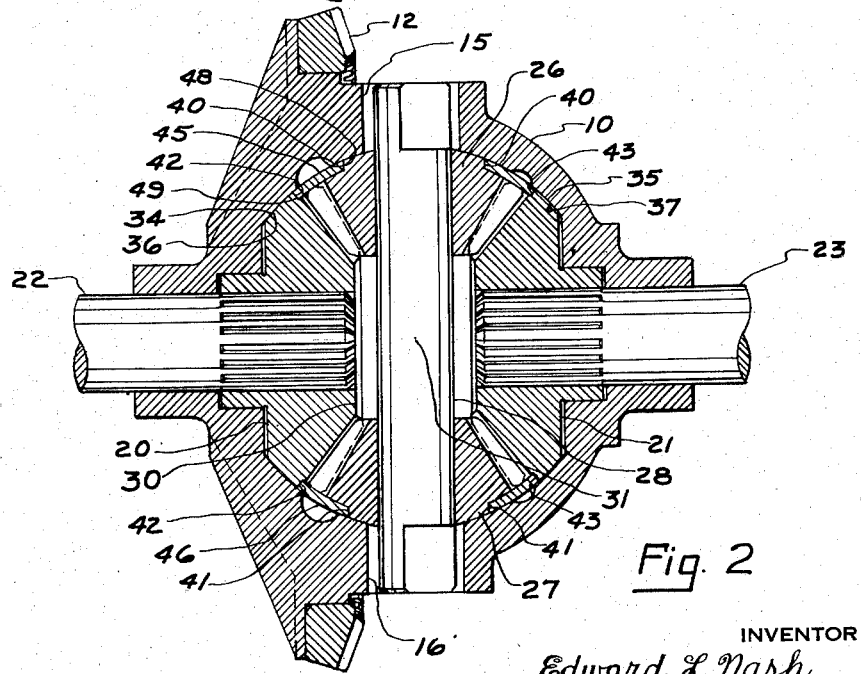
Fig. 2 is a sectional view taken on line II—II of Fig. 1.

Referring to Fig. 2, there is disposed in case 10 two axially aligned side bevel gears 20 and 21 which are respectively connected to axles 22 and 23. Axles 22 and 23 have longitudinal axis 11 as their axis of rotation. Spline connections are provided between the side gears and the axles so that each side gear rotates with its axle but is axially movable relative to the axle and the case 10.

Disposed in meshing engagement with side gears 20 and 21 and in generally normal relation thereto are two driving pinions 26 and 27. Pinions 26 and 27 are journaled on a pinion shaft 28 which has its radially outer ends slidably disposed in camming slots 15 and 16. Pinion shaft 28 is pivotal or tiltable about a midpoint thereof, indicated by the reference numeral 31, in the plane of camming slots 15 and 16. This tiltable movement of pinion shaft 28 and the tilting force imparted to shaft 28 through the camming surfaces of slots 15 and 16 is dependent upon and corresponds to axle load conditions. The tilting of pinion shaft 28 causes pinion gears 26 and 27 to move in opposite directions towards and into abutting engagement with axially movable side gears 20 and 21 respectively. When case 10 rotates in one direction pinion gear 26 moves towards and abuttingly engages side gear 20 and pinion gear 27 moves towards and abuttingly engages side gear 21. When case 10 rotates in the opposite or reverse direction pinon gear 26 moves towards and abuttingly engages side gear 21 and pinion gear 27 moves towards and abuttingly engages side gear 20. When a pinion gear 26 or 27 abuttingly engages an axially movable side gear 20 or 21 the side gear is forced into frictional engagement with a cone clutching surface in the case 10.

Various clutching arrangements could be provided and it is only by way of example that a spherical clutching arrangement is illustrated. In the spherical clutching arrangement convex spherical surfaces 34 and 35 are provided on side gears 20 and 21 and complementary spherical clutching surfaces 36 and 37 are provided on the inner walls of case 10. The friction surfaces 34, 35, 36 and 37 have the characteristic that the frictional resistance to sliding or slipping between two engaging surfaces increases and decreases in accordance with the magnitude of a force applied to move the engaging surfaces together. Thus the magnitude of the torque which can be developed and transmitted from the case 10 to one of the gears 20 or 21 through one of the spherical clutches is dependent upon the magnitude of the force which biases a gear 20 or 21 against one of the clutch surfaces 36 or 37 of the case.

As mentioned above, pinion shaft 28 is pivotal or tiltable about a midpoint 31 thereof and this tiltable movement of the pinion shaft 28 results in lateral movement of pinion gears 26 and 27 to the extent that pinion gears 26 and 27 abut and cause side gears 20 and 21 to move axially and into forcible engagement with the clutch surfaces 36 and 37 of the case 10. Abutting means are provided between pinion gears 26 and 27 and side gears 20 and 21 to facilitate the abutting engagement and this is a main feature of the invention.

Figure 3:
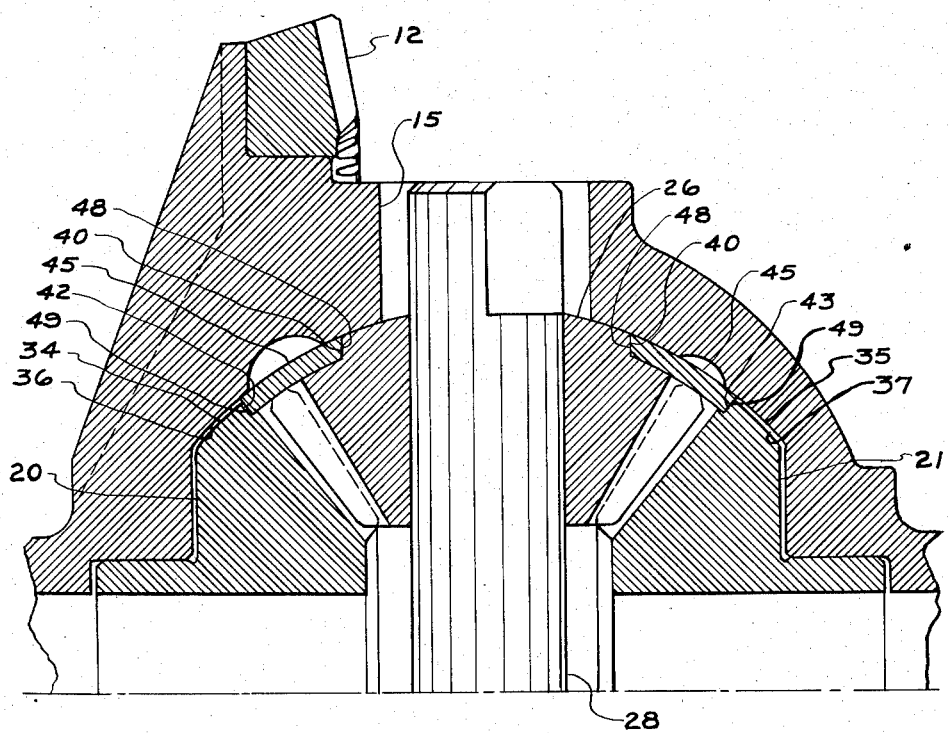
Fig. 3 is an enlarged fragmentary view of a portion of Fig. 2.

With reference to Fig. 2, and especially Fig. 3, there are provided flanges 40 and 41 on pinion gears 26 and 27 and flanges 42 and 43 on axially movable side gears 20 and 21. The flange on each gear is recessed somewhat relative to the dedendum of the gear and extends outwardly from the outer ends of the teeth of the gear. Two generally frusto-conically shaped load washers 45 and 46 are mounted on one pair of the gears 26 and 27 (or 20 and 21) and by way of illustration are shown mounted on pinion gears 26 and 27. The load washers 45 and 46 and the manner in which they are mounted are identical and only load washer 45 is referred to in detail. Load washer 45 has an inner periphery 48 in surrounding and abutable relation to the flange 40 on pinion gear 26, and an outer periphery 49 in abutable relation to the flanges 42 and 43 on side gears 20 and 21. In the position of pinion gear 26 shown in Figs. 2 and 3, load washer 45 rests primarily on the ends of the teeth of pinion gear 26 and on the ends of the teeth of side gears 20 and 21 on diametrically opposite sides of pinion gear 26. When pinion gear 26 rotates 180° to the bottom of case 10 the load washer 45 rests on the inner wall of the case 10 and is thereby prevented from dropping away from its position between the flanges of pinion gear 26 and side gears 20 and 21.

Load washer 45 has a generally rectangular cross section and fits loosely between the flanges on the gears. To facilitate mounting washer 45 on pinion gear 26 the flange 40 of gear 26 is formed so that the annular surface thereof is cylindrical in shape and the inner periphery 48 of washer 45 is formed to be generally parallel thereto when the washer is in its installed position. It will be understood, however, that the cross sectional shape of the washer and the angles and positioning of the flanges relative thereto may vary somewhat within the scope of the invention.

The extent of movement of axially movable side gears 20 and 21 between their clutched and unclutched positions is only a few thousandths of an inch and the lateral movement of pinion gears 26 and 27 away from their neutral position into operable abutting engagement with side gears 20 and 21 is also only a few thousandths of an inch. The abutting forces between the pinion gears and the side gears is transmitted through the respective flanges on the gears and the load washers 45 and 46. The width of a washer between its inner and outer peripheries should be adequate to prevent bottoming and/or binding between meshing teeth when a pinion gear is urged in either direction towards a side gear.

Figure 4:
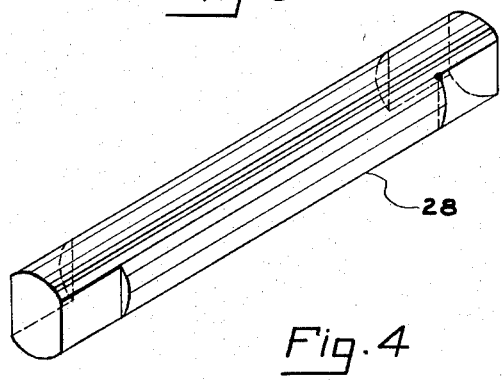
Fig. 4 is a perspective view showing the shaft for the pinion gears.

Referring to Fig. 4, the pinion shaft 28 is illustrated as having each of the opposite ends thereof formed with parallel surfaces which are spaced so that the outer portion of the pinion shaft has a sliding fit in its corresponding camming slot 15 or 16.

Camming slots 15 and 16 are equally inclined relative to the longitudinal axis 11 of the case 10 as viewed in Fig. 1. With reference to Fig. 2, the direction of rotation of case 10 may be in a direction that causes the camming action of slots 15 and 16 to cause pivotal or tilting movement of pinion shaft 28 so that the upper portion of shaft 28 tilts to the left and the lower portion to the right. This is of course assuming that axles 22 and 23 present at least a small resistance to turning so that a reaction force is developed which causes pivoting or tilting of pinion shaft 28 relative to case 10. Under these conditions pinion gear 26 moves to the left and a force is transmitted from flange 40 of gear 26 through load washer 45 to flange 42 of side gear 20 and side gear 20 is forced to the left into frictional engagement with case 10. Likewise pinion gear 27 moves to the right and a force is transmitted from flange 41 of gear 27 through load washer 46 to flange 43 of side gear 21 and side gear 21 is forced to the right into frictional engagement with case 10. If the direction of rotation of case 10 were reversed, as when a vehicle is operated in reverse for example, opposite tilting of pinion shaft 28 would occur and pinion gear 26 would effect biasing of side gear 21 to the right and pinion gear 27 would effect biasing of side gear 20 to the left.

Assume by way of example that a wheel connected to axle 23 is on a slippery surface such as ice so that only 150 ft.-lbs. of torque can be developed to axle 23. A relatively small reaction force corresponding to this 150 ft.-lbs. of torque will cause pinion gears 26 and 27 to effect the moving of side gears 20 and 21 into sliding frictional engagement with the frictional surfaces 36 and 37 on case 10. The frictional engagement between case 10 and side gears 20 and 21 allows additional torque to be developed and transmitted to side gear 20 so that the total torque transmitted from case 10 to axle 22 may be about 360 ft.-lbs. If the torque which can be developed in axle 23 were 300 ft.-lbs., the reaction force which causes pinion shaft 28 to tilt is substantially greater so that the force which biases side gears 20 and 21 into frictional engagement with the case 10 is substantially greater. The torque which is then transmitted from case 10 to axle 22 will be correspondingly greater so that the total torque transmitted from case 10 to axle 22 may be on the order of 810 ft.-lbs.

If it is a wheel connected to axle 22 that is on a slippery surface such as ice, the operation of the non-slip differential is the same as described above except that the additional torque is then developed in the opposite axle 23.

The reference to specific values of torque is merely by way of illustration and the ratios of the torques developed in the axles may be varied as desired. Different ratios may be obtained for example by varying the angles of inclination of the camming slots 15 and 16 relative to the longitudinal axis 11 of case 10 and by varying the coefficient of sliding friction between friction surfaces on the side gears 20 and 21 and on case 10. The highest torque dividing ratio will be obtained when the slots 15 and 16 are at 45° angles relative to case axis 11 and will decrease when varied either way from this angle.

The invention may be embodied in other specific forms without departing from the spirit or general characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:
1. A differential mechanism comprising in combination a rotatable differential case, two axially aligned bevel side gears rotatably mounted in said case with at least one of said side gears being axially movable relative to said case, clutch surface means on each axially movable side gear, clutch surface means carried by and in fixed relation to said case for frictional engagement with said clutch surface means on each axially movable side gear, a pinion shaft having an outer end operably engaging said case, means for moving said pinion shaft laterally relative to said case in the direction of said side gears, a bevel pinion gear journaled on said pinion shaft for lateral movement with said pinion shaft and being disposed in meshing engagement with said side gears, said side gears and said pinion gear each having an annular flange, an annularly shaped load washer for transmitting forces from said pinion gear to said side gears for moving said side gears axially thereof into clutching engagement with said case, said washer having an inner and an outer periphery, and said load washer being mounted on one of said gears with the inner periphery thereof in surrounding and abutable relation to the flange on that gear and the outer periphery thereof in abutable relation to the flange on each adjacent gear in mesh with the gear on which the washer is mounted.

2. A differential mechanism comprising in combination a rotatable differential case having an inclined camming slot, two axially aligned bevel side gears rotatably mounted in said case with at least one of said side gears being axially movable relative to said case, clutch surface means on each axially movable side gear, clutch surface means carried by and in fixed relation to said case for frictional engagement with said clutch surface means on each axially movable side gear, a pinion shaft having an outer end slidably engaging said camming slot to effect movement of said pinion shaft relative to said case in the direction of each axially movable side gear for moving said side gears in an axial direction, a bevel pinion gear journaled on said pinion shaft and disposed in meshing engagement with said side gears, said side gears and said pinion gear each having an annular flange, an annularly shaped load washer having an inner and an outer periphery, said load washer being mounted on one of said gears with the inner periphery thereof in surrounding and abutable relation to the flange on that gear, and the outer periphery thereof in abutable relation to the flange on each adjacent gear in mesh with the gear on which the load washer is mounted.

3. A differential mechanism comprising in combination a rotatable differential case, two axially aligned bevel side gears rotatably mounted in said case with at least one of said side gears being axially movable relative to said case, clutch surface means on each axially movable side gear, clutch surface means carried by and in fixed relation to said case for frictional engagement with clutch surface means on each axially movable side gear, a pinion shaft having an outer end operably engaging said case, means for moving said pinion shaft laterally relative to said case in the direction of said side gears, a bevel pinion gear journaled on said pinion shaft for lateral movement with said pinion shaft and being disposed in meshing engagement with said side gears, said side gears and said pinion gear each having an annular flange, an annularly shaped load washer for transmitting forces from said pinion gear to said side gears for moving said side gears axially thereof into clutching engagement with said case, said washer having an inner and an outer periphery and an outer annular surface between said peripheries, said load washer being mounted on one of said gears with the inner periphery thereof in surrounding and abutable relation to the flange on that gear and the outer periphery thereof in abutable relation to the flange on each adjacent gear in mesh with the gear on which the washer is mounted, and said load washer having the outer annular surface thereof in closely spaced relation to the internal surface of said case to maintain said washer in its mounted position.

4. A differential mechanism comprising in combination a rotatable differential case, two axially aligned bevel side gears rotatably mounted in said case with at least one of said side gears being axially movable relative to said case, clutch surface means on each axially movable side gear, clutch surface means carried by and in fixed relation to said case for frictional engagement with said clutch surface means on said side gears, a pinion shaft having its outer ends operably engaging said case, means for moving said pinion shaft laterally relative to said case in the direction of said side gears, a bevel pinion gear journaled on said pinion shaft for lateral movement with said pinion shaft and being disposed in meshing engagement with said side gears, said side gears and said pinion gear each having an annular flange, a generally frusto-conically shaped load washer for transmitting forces from said pinion gear to said side gears for moving said side gears axially thereof into clutching engagement with said case, said washer having an inner and an outer periphery and an outer annular surface between said peripheries, said load washer being mounted on one of said gears with the inner periphery thereof in surrounding and abutable relation to the flange on that gear and the outer periphery thereof in abutable relation to the flange on each adjacent gear in mesh with the gear on which the load washer is mounted, and said load washer having the outer annular surface thereof in closely spaced relation to the internal surface of said case to maintain said load washer in its mounted position.

5. A differential mechanism comprising in combination a rotatable differential case, two axially movable and axially aligned bevel side gears rotatably mounted in said case, clutch surface means on each of said side gears, clutch surface means carried by and in fixed relation to said case for frictional engagement with said clutch surface means on said side gears, a pinion shaft having its outer ends operably engaging said case, means for moving said pinion shaft laterally relative to said case in the direction of said side gears, a bevel pinion gear journaled on said pinion shaft for lateral movement with said pinion shaft and being disposed in meshing engagement with said side gears, said side gears and said pinion gear each having an annular flange with the surface thereof recessed relative to the dedendum of the gear, a generally frusto-conically shaped load washer for transmitting forces from said pinion gear to said side gears for moving said side gears axially thereof into clutching engagement with said case, said washer having an inner and an outer periphery, said load washer being mounted on said pinion gear with the inner periphery thereof in surrounding and abutable relation to the flange on said pinion gear and the outer periphery thereof in abutable relation to the flanges on said side gears.

6. A differential mechanism comprising in combination a rotatable differential case, two axially movable and axially aligned bevel side gears rotatably mounted in said case, clutch surface means on each of said side gears, clutch surface means carried by and in fixed relation to said case for frictional engagement with said clutch surface means on said side gears, a pinion shaft having its outer ends operably engaging said case, means for moving said pinion shaft laterally relative to said case in the direction of said side gears, a bevel pinion gear journaled on said pinion shaft for lateral movement with said pinion shaft and being disposed in meshing engagement with said side gears, said side gears and said pinion gear each having an annular flange with the surface thereof recessed relative to the dedendum of the gear, an annularly shaped load washer for transmitting forces from said pinion gear to said side gears for moving said side gears axially thereof into clutching engagement with said case, said washer having an inner and an outer periphery and an outer annular surface between said peripheries, said load washer being mounted on said pinion gear with the inner periphery thereof in surrounding and abutable relation to the flange on said pinion gear and the outer periphery thereof in abutable relation to the flanges on said side gears, and said load washer having the outer annular surface thereof in closely spaced relation to the internal surface of said case to maintain said load washer in its mounted position.

7. A differential mechanism comprising in combination a rotatable differential case having inclined camming slots on diametrically opposite sides of the axis of rotation thereof, two axially movable and axially aligned bevel side gears rotatably mounted in said case, clutch surface means on each of said side gears, clutch surface means carried by and in fixed relation to said case for frictional engagement with said clutch surface means on said side gears, a pinion shaft having its opposite ends slidably engaging said camming slots to effect movement of said pinion shaft relative to said case in the direction of said side gears for moving said side gears in an axial direction, two bevel pinion gears journaled on said pinion shaft and disposed in meshing engagement with said side gears, said side gears and said pinion gears each having an annular flange, two generally frusto-conically shaped load washers each having an inner and an outer periphery, one of said load washers being mounted on each of said pinion gears with the inner periphery thereof in surrounding and abutable relation to the flange on said pinion gear and the outer periphery thereof in abutable relation to the flanges on said side gears.

8. A differential mechanism comprising in combination a rotatable differential case having inclined camming slots on diametrically opposite sides of the axis of rotation thereof, two axially movable and axially aligned bevel side gears rotatably mounted in said case, clutch surface means on each of said side gears, clutch surface means carried by and in fixed relation to said case for frictional engagement with said clutch surface means on said side gears, a pinion shaft having its opposite ends slidably engaging said camming slots to effect movement of said pinion shaft relative to said case in the direction of said side gears for moving said side gears in an axial direction, two bevel pinion gears journaled on said pinion shaft and disposed in meshing engagement with said side gears, said side gears and said pinion gears each having an annular flange with the surface thereof recessed relative to the dedendum of the gear, two generally frusto-conically shaped load washers each having an inner and an outer periphery and an outer annular surface between said peripheries, one of said load washers being mounted on each of said pinion gears with the inner periphery thereof in surrounding and abutable relation to the flange on said pinion gear and the outer periphery thereof in abutable relation to the flanges on said side gears, and each of said load washers having the outer annular surface thereof in closely spaced relation to the internal surface of said case to maintain said load washers in their mounted positions.

References Cited in the file of this patent
UNITED STATES PATENTS 1,324,860    Taylor _____ Dec. 16, 1919

FOREIGN PATENTS 736,780    Germany _____ Jan. 28, 1943

OTHER REFERENCES

Motor Magazine, Jan. 1956 issue, pp. 24, 25.